Patented Feb. 19, 1952

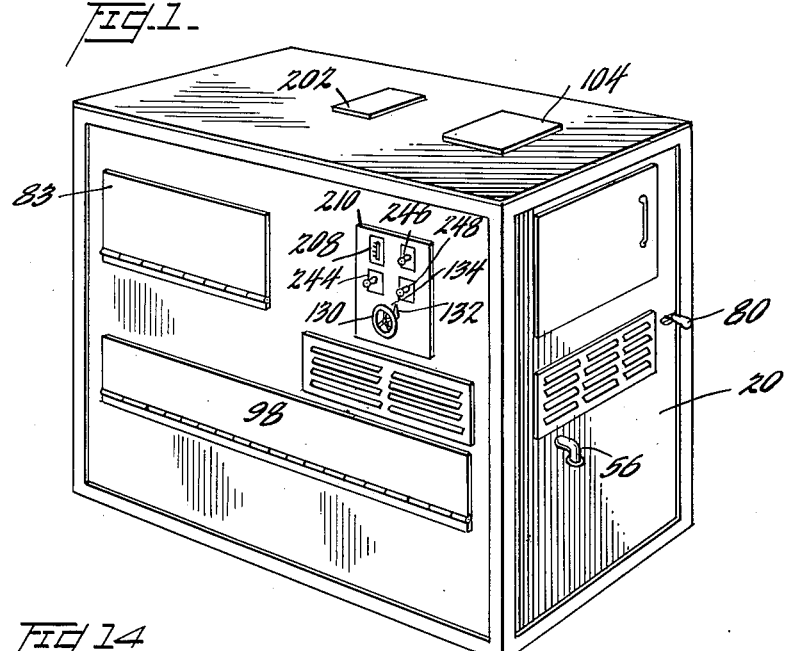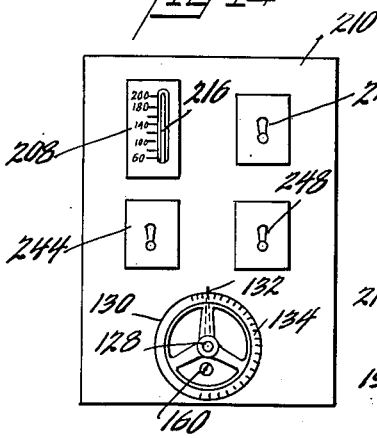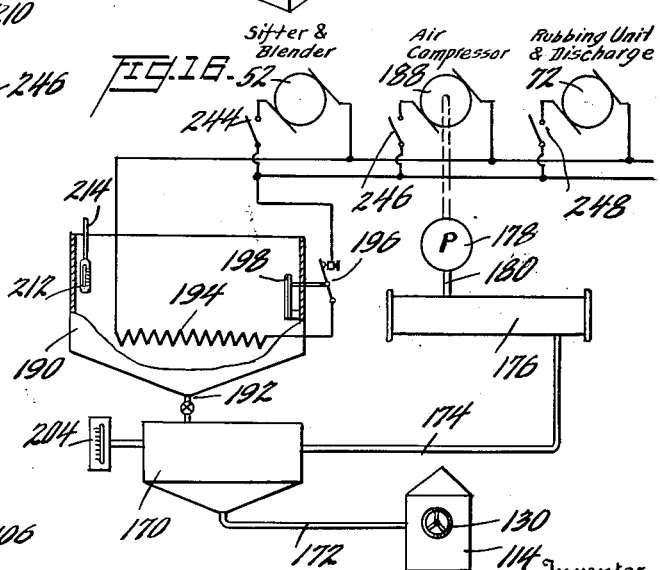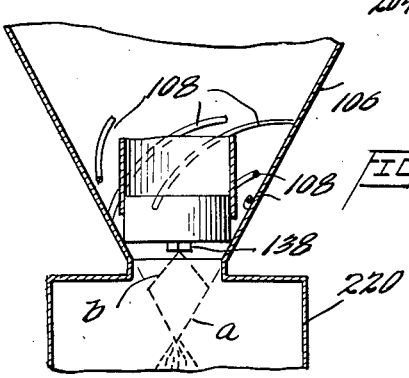

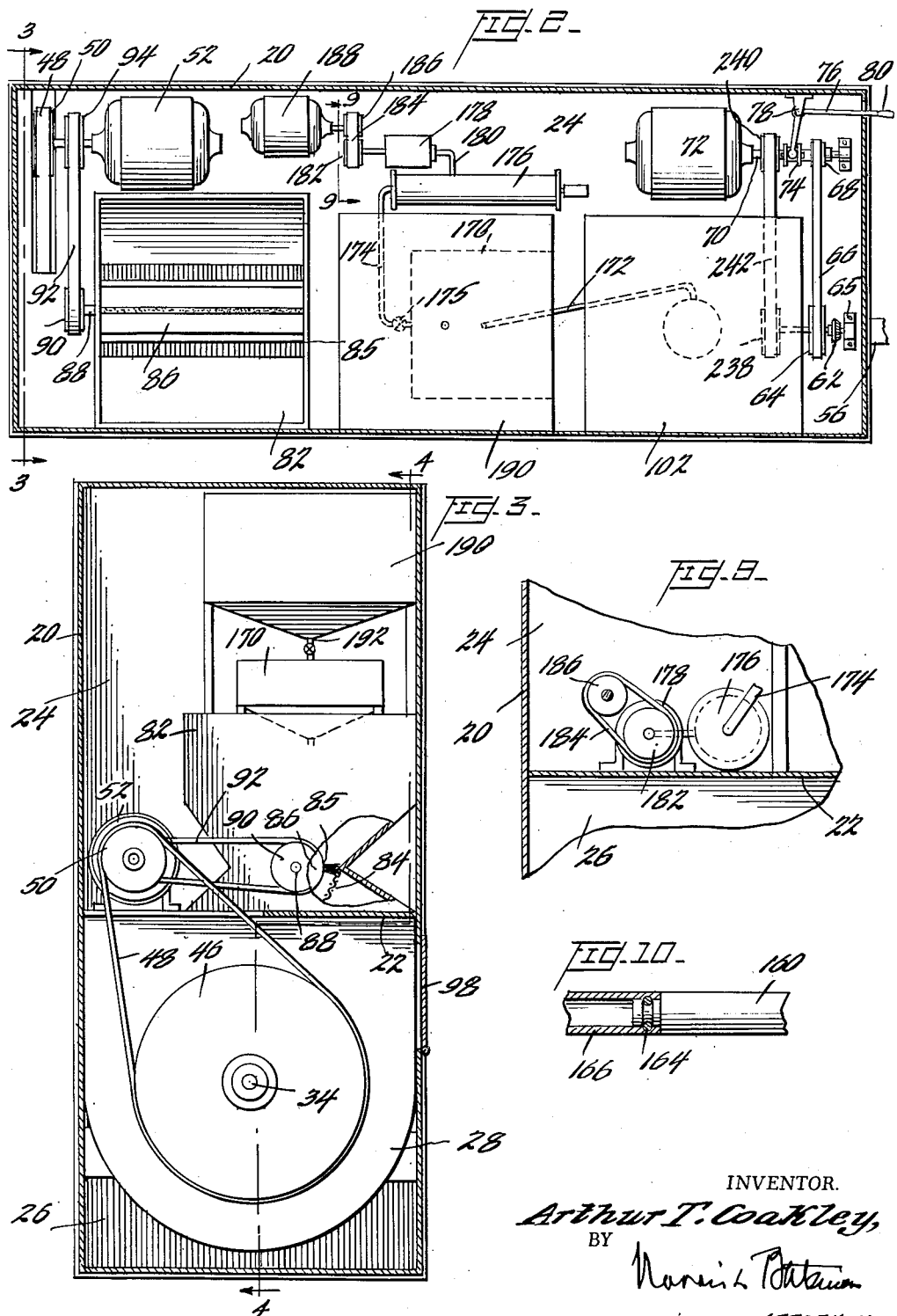

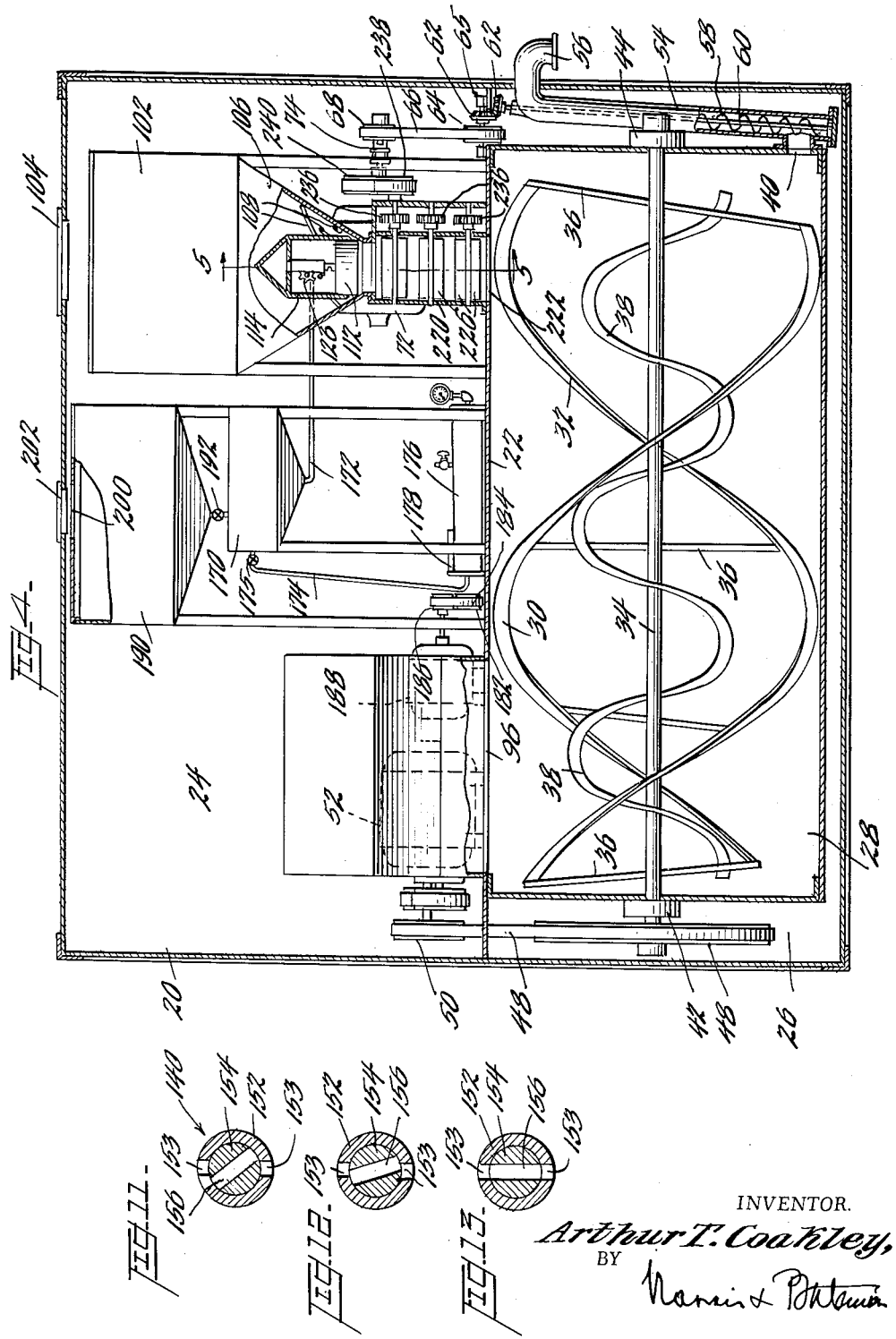

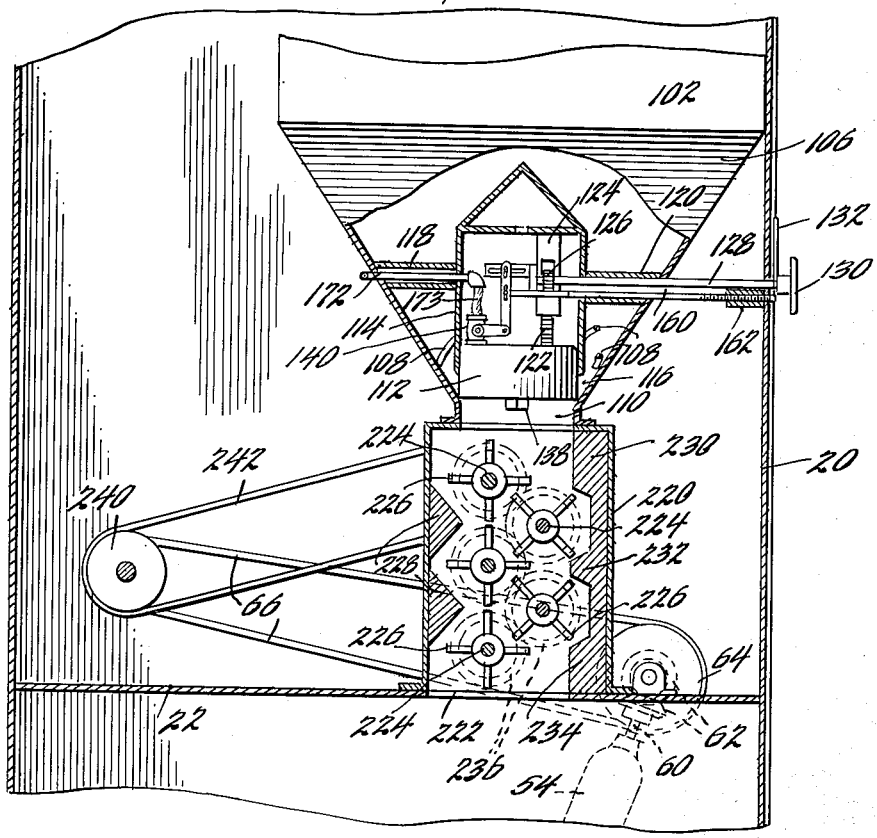

2,586,613

UNITED STATES PATENT OFFICE 2,586,613

APPARATUS FOR COMBINING FINELY DIVIDED SOLID MATERIAL WITH LIQUID

Arthur T. Coakley, Catonsville, Md.

Application September 7, 1949, Serial No. 114,358

10 Claims. (Cl. 259—6)

The present invention relates to an apparatus for combining or uniting various dry granular, powdery, pulverulent or other finely divided fluent solid materials with liquids, or oils, fatty or similar substances which have been reduced to a sufficiently fluent or liquid state by melting or other method of liquefaction.

One of the primary objects of the invention is to provide a novel means for combining or uniting and rubbing together hydrogenated vegetable oils and essential oils, such as oil of orange or lemon, with finely granulated sugar, and blending the resulting mass with other dry ingredients in one continuous operation in which the proportions of the ingredients are controlled. The invention is applicable, for example, to the preparation of dry formulae bases for cake, biscuit, cruller, waffle and doughnut mixes and the like. In the preparation of such bases, it is necessary to mix together such ingredients as wheat flour, soy flour, sugar, shortening, egg yolk, egg white, lecithin, skim milk, whole milk, butter milk, baking acids, bicarbonate of soda, salt, spices, liquid flavors and other materials.

Shortening and sugar can be combined and rubbed or creamed to desire degrees of consistency varying from a fluffy snow-like mass to a heavy emulsion, dependent upon the proportion of liquid shortening to dry granulated or pulverulent sugar used and upon the duration of the rubbing operation, by placing a batch of such ingredients in a mixing chamber and turning the mass by means of rotating arms or blades.

The present invention provides an apparatus whereby the combining and rubbing together of such materials can be performed more rapidly and economically by first impregnating the sugar with the liquefied shortening and then rubbing therewith. The sugar is impregnated with the liquefied shortening while the sugar is flowing and preferably spinning in the form of a hollow inverted cone, and the shortening is sprayed in the form of a hollow cone directly upon the inner surface of the hollow cone of flowing sugar, the shortening and sugar brought together in controlled proportion. The impregnated mass of sugar and shortening is then rubbed by passing the mass continuously through a chamber containing a series of bladed elements which are rotated alternately in opposite directions throughout the series and operate frictionally upon the mass. When the shortening-impregnated and rubbed sugar is to be employed in the preparation of bakery and similar products, it is discharged continuously into a dry materials blender which incorporates the shortening-impregnated and rubbed sugar with the dry ingredients such as are used in the preparation of such products.

The invention, however, is applicable more generally to the impregnating and rubbing together of various other liquids or liquefied substances and granular, pulverulent or other fluent solid materials, either edible or inedible, such for example as the combining or compounding of face powder, tooth powder or body powder with scenting or flavoring oils; feeds, meals or laying mash; or the incorporation of fish oils or vitamin agents with food products; and other desired combinations, the invention being applicable to the impregnating or saturating and rubbing of various dry granular, pulverulent or finely divided and fluent solid materials with any liquid or mixture of liquids, and/or oily or fatty substances in a liquid state while the solid materials and liquid substances are flowing at rates which are regulated relatively to one another whereby they will be combined or united in direct desired proportion.

The present invention also provides a unitary and compact apparatus wherein the process of impregnating and rubbing of the sugar or other fluent solid material with shortening or other liquid or liquefied substance or substances while flowing continuously and in predetermined regulated proportion, and the blending of the resulting impregnated and rubbed product with mixes such as used in bakeries and similar establishments, may be performed in a single and complete operation.

The invention may be carried out advantageously with the aid of apparatus substantially of the preferred form shown in the accompanying drawings, wherein—

Figure 1 is a perspective view of the complete apparatus as viewed from the exterior, showing the controls, and means of access to the various enclosed elements of the apparatus.

Figure 2 is a horizontal section of the apparatus on an enlarged scale, and taken in a plane immediately below the top of the casing.

Figure 3 is a vertical section taken on the line 3—3 in Fig. 2.

Figure 4 is a vertical section taken on the line 4—4 in Fig. 3, portions of some of the elements being broken away.

Figure 5 is a detail vertical section on the line 5—5 in Fig. 4 and on an enlarged scale, of the impregnating and rubbing elements of the apparatus.

Figure 6 is an enlarged vertical section of the regulating means for proportioning the liquid and solid material.

Figure 7 is a detail horizontal section on the line 7—7 in Fig. 6.

Figure 8 is a detail section of the nozzle for spraying the liquid or liquified substance in the form of a hollow cone.

Figure 9 is a detail vertical section on the line 9—9 in Fig. 2.

Figure 10 is a detail view of the swivel connection between the member for varying the proportion of liquid to solid material and its exterior control.

Figures 11, 12 and 13 are detail sectional views showing the liquid controlling valve in closed, partially open and fully open position, respectively.

Figure 14 is an enlarged view of the control panel.

Figure 15 is a diagrammatic view illustrating the manner in which the liquid is sprayed in the form of a hollow cone against the solid material while the latter is advancing in the form of a hollow inverted cone.

Figure 16 is a diagrammatic view showing the liquid supply means, and the motors and their circuits for operating the elements of the apparatus.

Similar parts are designated by the same reference numerals in the several figures.

Referring more particularly to the accompanying drawings, 20 designates generally a casing, preferably of substantially rectangular form, which encloses the various elements of the apparatus, the casing being composed of sheet metal or other suitable material. The casing is divided interiorly by a horizontal partition 22 into upper and lower compartments 24 and 26 respectively, the lower compartment being a batch blender comprising a trough 28 having blending or mixing blades mounted to rotate therein, the blender shown having two blades 30 and 32 which are fixed to a shaft 34 by supporting arms 36 so that they extend helically around the shaft in diametrically opposite relation thereto, these blades being of a diameter to operate in relatively close proximity to the bottom and sides of the trough, both of these blades having a pitch in a direction to advance the material in the trough toward the right-hand end thereof as viewed in Fig. 4, and the blender has an auxiliary blade 38 of smaller diameter than that of the blades 30 and 32 which is fixed to the supporting arms 36 and extends around the shaft with a pitch in the opposite direction to that of the blades 30 and 32 so that this smaller blade will act to return the material toward the left-hand end of the trough. The effect of the oppositely-pitched blades is to cause a back and forth movement of the material undergoing blending to effect thorough mixing thereof, although the blades 30 and 32 serve to effectively feed the material to the discharge opening 40 located at the right-hand end of the trough.

The shaft 34 of the blender is journaled in bearings 42 and 44 mounted on the end walls of the trough, and is provided with means for rotating it in the appropriate direction, it being provided in the present instance with a pulley 46 which is connected by a belt 48 to a pulley 50 on the shaft of an electric motor 52 in the upper compartment of the casing and mounted on the partition 22. The batch of blended materials is discharged from the blender through the discharge opening 40 by any suitable means, preferably by a screw conveyor comprising a tubular casing 54 which has an opening in its lower end to receive the materials from the opening 40 and has a spout 56 for the discharge of the product into a suitable container. The conveyor casing contains a screw 58 or worm which encircles a shaft 60 rotatably mounted therein, the upper end of this shaft being connected by gearing 62 to a pulley 64 the shaft of which is journaled in bearings 65 which may be mounted on the partition 22. The discharge conveyor is so constructed as to be easily opened at the bottom for cleaning and removal of residue. The pulley 64 is connected by a belt 66 to a pulley 68 which is mounted loosely on the shaft 70 of an electric motor 72 but is adapted to be coupled to the motor shaft by a jaw clutch member 74 which is splined on the motor shaft and may be shifted axially thereon to connect the pulley 68 to the motor shaft by a bell-crank lever 76 pivoted to the casing at 78 and having an operating handle 80 which extends through the casing to the exterior thereof where it is accessible for operation. By engaging the clutch member 74 with the pulley 68, the screw conveyor may be set into operation to discharge a batch of blended materials from the blender at a level suitable for packing on the same floor on which the blender loading operation is performed, thus providing a highly efficient and compact operational arrangement without necessitating elevating the blender or mixer to allow for insertion of containers for gravity discharge on one floor, or piping the gravity outlet through the floor to a lower floor level as heretofore practiced.

The flour and other dry material with which liquid-impregnated and rubbed sugar is to be blended are supplied from a hopper 82 mounted in the upper compartment of the casing on the partition 22, a hinged chute 83 being provided in the front of the casing for loading dry materials into this hopper. The bottom of this hopper is provided with a suitable sieve, that shown, for example, comprising a substantially semi-cylindrical sieve surface 84 over the surface of which rotating bars 85 travel, these bars being fixed on the periphery of a drum 86 which is mounted on a shaft 88 journaled in the ends of the hopper, and which bars are equipped with brushes which rub against said sieve surface. The sieve shaft 88 is driven in any suitable manner, it having in the present instance a pulley 90 fixed thereon which is connected by a belt 92 to a pulley 94 on the shaft of the motor 52. The portion of the hopper 82 below the sieve surface is preferably flared downwardly and communicates with the open top of the blender 28 through an opening 96 provided in the partition 22 adjacent to the end of the blender which is remote from its discharge end. A side of the trough 28 of the blender is provided with a hinged clean-out door 98.

A hopper 102 is provided to supply the sugar or other granular, pulverulent or other fluent solid material to be impregnated with the shortening or other liquid or liquefied substance, this hopper being open at the top and the top of the outer casing 20 being provided with a door 104 through which the sugar or solid material may be introduced into this hopper. The lower section 106 of the hopper 102 is in the form of an inverted cone and its inner surface is provided preferably with a suitable number of spiral ribs or flanges 108 to impart a spinning motion to the material descending by gravity within this conical section. The lower extremity of the conical section 106 is provided with a circular discharge opening 110 which is concentric with the axis of the conical section 106, and this opening is controlled by a valve, which is preferably in the form of a cylindrical gate valve or piston 112 which is somewhat larger than the opening 110 and is mounted to slide vertically in a cylindrical housing 114 in alinement with the discharge opening 110 and to cooperate with the conical inner surface of the section 106 adjacent to and surrounding said opening as a valve seat. The housing 114 is suitably supported in fixed position with its lower edge spaced above the lower portion of the wall of the conical section 106 to provide an annular passage 116 through which the solid material descending over the inner surface of said conical section may pass to the discharge opening 110 under control of the valve 112. The housing 114 is shown rigidly supported in the position described by tubular supporting members 118 and 120 which are welded or otherwise fixed to the housing and to the conical section of the hopper. As the sugar or solid material descends by gravity in the conical section 106, a spinning motion is imparted thereto by the spiral ribs 108, and as said material discharges downwardly through the circular opening 110 it is formed into a hollow inverted cone, as indicated diagrammatically in Fig. 15.

The valve 112 is raised or lowered to vary the area of the discharge passage 116 by suitable means, such means as shown in the present instance comprising a rack bar 122 which is welded or otherwise fixed to the top of the valve and guided by a guideway 124 which is fixed to the upper portion of the housing 114, and by a pinion 126 which meshes with the rack bar and is fixed to the inner end of a shaft 128, this shaft extending outwardly through the housing and conical section of the hopper and through the wall of the outer casing to the exterior thereof where it is provided with a hand wheel 130 for rotating it. The shaft 128 carries a pointer 132 arranged to cooperate with a scale or dial 134 which is graduated to indicate different rates of flow of the sugar or other dry solid material through the discharge passage 116 and thereby facilitate the setting of the control valve 112. The inner end of the pinion shaft 128 may be supported by a bracket 136 welded or otherwise fixed to the fixed guideway 124.

The shortening or other liquid or liquefied substance to be used for impregnating the sugar or other solid material is sprayed against the inner side of the hollow inverted cone $a$ of the sugar or solid material in the form of a hollow cone $b$ of the liquid which is coaxial with the hollow inverted cone $a$, as indicated diagrammatically in Fig. 15, by a spray nozzle 138 which is fixed centrally in the lower end of the valve 112 to discharge the spray of liquid downwardly and axially through the circular opening 110, this nozzle being of any well known type capable of atomizing and spraying liquid in the form of a hollow cone. This nozzle is supplied with the liquid or liquefied substance through a control valve 140 which is fixed to the control valve 112 for the solid material so that it will move upwardly and downwardly therewith during its adjustments, and is connected to the spray nozzle 138 by a suitable conduit 141. The extent of opening of the liquid control valve 140 is regulated synchronously and in correlation with the extent of opening of the solid material control valve 112 by suitable means. The means shown in the present instance for effecting such synchronous and correlative regulation of these valves comprises a link 142 pivotally connected at its lower end to an arm 144 which effects the opening and closing of the valve 140, and is provided at its upper end with a pin 146 which engages in and is adjustable along a slot 148 in a relatively fixed or stationary extension 150 of the bracket 136. The liquid control valve 140 is shown in the form of a plug valve comprising an outer casing 152 having diametrically alined ports 153 therein, and a plug 154 rotatable in the casing and connected to the operating arm 144, the plug having a port 156 extending diametrically therethrough which is adapted to fully register with the ports 153 in the valve casing to fully open the valve, as shown in Fig. 13, or to be rotated to carry the port 156 entirely out of register with the ports 153, to fully close the valve, or to occupy an intermediate position in its rotation as shown in Fig. 12 to partially open the valve and thereby throttle the flow of liquid therethrough.

The controlling link 142 and arm 144 for the valve 140 are preferably so designed and proportioned that while the solids materials control valve 112 is fully closed, as shown in Fig. 6, the liquid control valve 140 will be in the fully closed position as shown in Fig. 11, and as the valve 112 is elevated to open it for the flow of the solid material, the plug 154 of the valve 140 will be rotated into a position to open this valve, more or less, as shown for example in Fig. 12, depending upon the extent of opening of the valve 112. Fig. 13 shows the valve 140 in its fully open position, which it assumes when the valve 112 is fully open.

The synchronous control thus provided between the solid material control valve 112 and the liquid control valve 140 proportions the rates of flow of the solid material and liquid and consequently the proportions of said material and liquid brought together and maintains such proportions for different extents of opening of these valves for a given setting of their intercontrolling connections, but these connections are adjustable to vary the proportioning of flow of the solid material and liquid as may be desired, such adjustment being provided by the slot 148 in the bracket 150 in which the pin 146 on the upper end of the link 142 is adjustable. Shifting of the link 142 angularly from its vertical position will shift the pin 146 on its upper end from the center toward an end of the slot 148, which will have the effect of reducing the extent of opening of the valve 140 for a given extent of opening of the valve 112 and of thereby reducing the proportion of liquid supplied relatively to solid material. Such adjustment of the link 142 may be effected from the exterior of the outer casing by a rod 160 the outer end of which is exposed at the exterior of the casing and slotted or otherwise formed for adjustment by a screw driver or other suitable tool, and the outer portion of this rod is threaded in a sleeve 162 fixed to the inner side of the adjacent wall of the casing whereby rotation of this rod will move it endwise. The inner end of the rod 160 is connected by a swivel joint 164 to a rod 166 to which endwise movement of the rod 160 is communicated, the inner end of the rod 166 being connected at 168 to the link 142 and operable by the endwise movements thereof to adjust the angular position of said link. Accordingly, rotation of the rod 160 in one direction will shift the pin 146 in a direction from the center toward an end of the slot 148 to reduce the rate of supply of liquid, and rotation of said rod in the opposite direction will move said pin toward the center of said slot and thereby relatively increase the rate of flow of liquid.

The liquid is supplied to the valve 140 from a supply tank 170 through a pipe 172, which preferably extends through the hollow supporting tube 118 and is connected to said valve by a flexible tube 173. Compressed air is preferably employed for feeding the liquid from the tank 170 at a suitable constant pressure, for which purpose this tank is closed and connected by a pipe 174 controlled by a valve 175 to a compressed air supply tank 176, the latter being charged with compressed air at a suitable constant pressure by a pump or other air compressor 178 which is connected to the tank 176 by a pipe 180 and is driven by a pulley 182 fixed to its shaft and connected by a belt 184 to a pulley 186 on the shaft of an electric motor 188. When shortening, fatty or similar materials are to be employed for impregnating sugar or other solid material, the shortening or similar substance is liquefied in a storage tank 190 which may be placed above the tank 170 and connected thereto by a valve-controlled pipe 192 for gravity flow into the tank 170 while the pressure is released from the latter tank. For example, the shortening or similar material may be melted by a heating element mounted in the lower portion of the tank 190, the heating element shown in the present instance being an electric heating coil 194 which is supplied with electric current under control of a switch 196 and this switch is preferably controlled automatically by a thermostat 198 which may be of the bimetal type or any other suitable type and immersed in the liquid in this tank and which maintains the liquid therein at a constant desired temperature. Shortening or other liquefiable material is introduced into the tank 190 through an opening 200 in the top thereof and through an opening in the top of the outer casing which is normally closed by a cover 202. The level of liquid in the tank 170 is indicated by a glass tube or other type of liquid level indicating gauge 204, which may be observed through an opening in the front of the casing which is normally closed by a hinged door 206. The temperature of the liquid in the tank 190 is indicated by a thermometer 208 the scale of which is located preferably on a panel 210 on the front of the outer casing, the thermometer being, for example, of the well known expansible fluid type comprising a phial 212 immersed in the liquid in the tank and containing such fluid, and connected by a tube 214 to a fluid column 216 adjacent to the scale 208.

The hollow inverted cone of sugar or other solid material and the hollow cone of liquid or liquefied substance are projected through the opening 110 into a rubbing chamber wherein thorough combining of the solid material and liquid takes place. The rubbing chamber comprises a casing 220 the upper end of which is fixed to the lower end of the conical section 106 of the solid material supply hopper and is open to receive the inverted cone of impregnated material therefrom, and the lower end of the casing 220 is fixed to the partition 22 which is provided with an opening 222 above the blender 28 for the discharge of the rubbed mass into the blender. The rubbing chamber has a suitable number of rubbing elements mounted to rotate therein, these rubbing elements comprising preferably rotatable shafts 224 journaled in the opposite ends of the casing and provided with blades 226 which project radially therefrom and extend axially thereof, these blades being solid or imperforate. It is preferable to employ a series of at least five of these rubbing elements each provided with four blades, and to arrange the rubbing elements in tiers in two parallel adjacent rows, three of these elements being shown in the present instance arranged in one row with their axes in a common vertical plane and two of these elements being arranged in an adjacent row with their axes in a common vertical plane and at levels respectively between the level of the axis of the middle element and the levels of the axes of the upper and lower elements of the three-tier row.

The casing 220 is provided at the inner side of one of its walls with deflectors 228 which extend inwardly between the circular paths of travel of the peripheries of the blades of the middle and upper and lower rubbing elements of the three-tier row of elements, respectively and have reversely inclined guiding surfaces, and said casing is provided at the inner side of its opposite wall with deflectors 230, 232 and 234 providing a pair of recesses with bevelled surfaces in which the rubbing elements of the two-tier row operate, and which latter deflectors are staggered relatively to the deflectors 228, thus forming a sinuous or tortuous channel for the passage of the material through the rubbing chamber, and in which channel the rubbing elements operate with minimum clearance. Means is provided for rotating the rubbing elements synchronously and alternately in relatively opposite directions in succession from the uppermost to the lowermost and from one tier to the other tier of the rubbing elements, such means as shown in the present instance comprising a train of intermeshing gears 236 fixed to the shafts of the rubbing elements and arranged to rotate the rubbing elements in the left hand tier in Fig. 6 in a clockwise direction and the rubbing elements in the right hand tier in said figure in the anti-clockwise direction. The blades of these elements in one tier during rotation thereof move synchronously into and out of the spaces between the blades of the rubbing elements in the adjacent tier, thereby producing a frictional or rubbing action on the mass of liquid impregnated solid material to effect a thorough combining or compounding action thereon, and to feed the mass of material downwardly through the sinuous or tortuous channel and discharge it into the blender to be mixed therein with dry solid materials to be contained as ingredients in the final product.

The gear train 236 is driven by a pulley 238 on the shaft of one of the rubbing elements, a pulley 240 on the shaft of the motor 72 and a belt 242 connecting these pulleys. These pulleys are preferably changeable with pulleys of different relative ratios of diameters, or may be of the well known variable diameter type to enable the speed of the rubbing elements to be varied appropriately for the treatment of materials of different physical properties or to obtain products of different consistencies.

The various elements of the apparatus are preferably controlled from the exterior of the enclosing casing. The rate of feed of the solid material to be sprayed with the liquid is controlled by the hand wheel 130 on the panel 210 and the proportion of liquid to solid material is adjustable by the exteriorly exposed slotted end of the rod 160, as previously stated, and the switch 244 for the sieve and blender operating motor 52, the switch 246 for the air compressor operating motor 188 and the switch 248 for the motor 72 for operating the rubbing elements and the discharge conveyor for the blender are also located on the panel 210 at the front of the casing.

In carrying out the process with the aid of an apparatus as hereinbefore described, the sugar or other granular or pulverulent solid material to be impregnated is placed in the supply hopper 102, the impregnating liquid, if an oily or fatty substance requiring liquefaction, is placed in the storage tank 190 and melted by the heating element 194 under control of the thermostatic switch 196 until it has the desired consistency and the liquefied substance is fed by gravity through the valve controlled pipe 192 into the liquid supply tank 170 where it is subjected to air pressure on its surface by compressed air supplied at a constant pressure through the pipe 174 from the air compressor 178, and the ingredients to be blended with the liquid impregnated solid material are placed in the hopper 82. Closing of the switches 244, 246 and 248 for the motors 52, 188 and 72 respectively sets into operation the sieve and batch blender, the air compressor, and the elements of the rubbing elements, the clutch 74 controlling the blender discharge conveyor being disengaged at the commencement of the operation.

While the apparatus is in operation and supplied with granulated, pulverulent or other fluent solid material and liquid for impregnating it, and compressed air is supplied to the supply tank 170 for feeding the liquid as hereinbefore described, the valve 112 is opened to the appropriate extent according to the desired rate of feed of solid material by rotating the hand wheel 130, and simultaneously therewith, the liquid control valve 140 is opened in consequence of the upward or opening movement of the valve 112 and the connection of the operating arm 144 of the valve 140 to the link 142, whereby the solid material will flow downwardly along the convergent inverted conical inner surface of the conical section 106 of the hopper 102, and in doing so will have a spinning or whirling motion imparted thereto by the spiral ribs 108. The granular or pulverulent solid material discharging by gravity through the circular opening 110 is formed into a spinning hollow inverted cone, and simultaneously the impregnating liquid supplied at a constant pressure to the nozzle 136 will be sprayed thereby in the form of a hollow cone inside of the hollow inverted spinning cone of granular or pulverulent solid material and against the inside of the descending hollow cone of solid material, thereby uniformly and thoroughly impregnating the solid material with the liquid, the spinning of the cone of solid material acting to fold the liquid into the dry solid material.

The liquid impregnated granulated or pulverulent solid material is discharged through the circular opening 110 into the rubbing chamber 220 in which it accumulates and is formed into a mass which substantially fills this chamber. This mass descends through the sinuous channel provided in this chamber and while doing so is successively rubbed frictionally by the interaction of the blades of the series of rubbing elements, thereby uniting or combining the liquid and granulated or pulverulent solid material uniformly throughout the mass.

The united or combined mass is discharged from the rubbing chamber through the discharge opening 222 into the blender 28 in a region in its length adjacent to its discharge end, where it is mixed with the other ingredients of the desired product which are introduced into the blender at or near its opposite end through the opening 96 below the sieve. The helically pitched blades of the blender act on the materials thus introduced therein to mix and blend these materials and to move them back and forth, and the blades 30 acting to move the materials toward the discharge end of the blender. The materials are thus treated in the blender until they are thoroughly mixed or blended, whereupon the handle 80 is operated to cause the clutch member 74 to engage the pulley 61 with the shaft of the motor 72, thereby setting the screw 60 of the discharge conveyor into operation to discharge the batch of material from the blender.

The proportioning of shortening or liquid to sugar or solid material is accurately correlated by the intercontrol between the valves controlling the flow thereof to different rates of flow of the solid material, so that the proportion of solid material and liquid is maintained, insuring at all times the desired proportion of sugar or solid material and shortening or liquid to be mixed with a batch of dry material in the blender.

An advantageous feature of the invention is that it enables the impregnating and rubbing or creaming of shortening and sugar to be performed while the sugar and shortening are flowing continuously and in a desired proportion which is predetermined, thus facilitating in a novel manner the blending of dry prepared mixes such as used in bakeries and similar establishments for cake, biscuit, doughnut and waffle formulae and the like, and enabling one single compact unit of machinery to be used to perform these operations in their entirety wherever desirable.

I claim:

1. Apparatus for combining finely divided solid material with liquid, comprising an inverted conical surface for the flow of the solid material thereover and having a circular opening at its lower end for discharge of said material in the form of a hollow inverted cone converging to one common point, and a spray nozzle located coaxially with said conical surface and centrally within said opening for atomizing liquid in the form of a hollow cone, and means connected directly to the nozzle for supplying liquid under pressure and in controlled volume thereto and for projecting atomized liquid against the inner side of the hollow cone of solid material.

2. Apparatus for combining finely divided solid material with liquid, comprising an inverted conical surface for the flow of the solid material thereover and having a circular opening at its lower end for discharge of said material in the form of a hollow inverted cone converging to one common point, means for controlling the rate of flow of the solid material from said surface to form the hollow cone of solid material, a nozzle located coaxially with said opening for atomizing liquid in the form of a hollow cone against the inner side of the hollow cone of solid material, and means for controlling the rate of flow of liquid to the nozzle.

3. Apparatus for uniting finely divided solid material and liquid in a predetermined proportion, comprising a hopper for the solid material having an inverted conical section for the flow of solid material thereover and having a circular opening at its lower end for the discharge of the solid material, an annular valve movable axially relatively to said opening to provide an annular discharge passage of variable area, means for spraying liquid in the form of a cone through the circular opening, and means connected to said valve for controlling the supply of liquid to the spraying means in accordance with the area of said discharge passage.

4. Apparatus for combining finely divided solid material and liquid in a predetermined proportion, comprising an inverted conical surface for the flow of the solid material thereover and having a circular opening at its lower end for discharge thereof, an annular valve movable axially relatively to said opening to provide an annular passage of variable effective area for the discharge of solid material through said circular opening in the form of a hollow inverted cone, a spray nozzle positioned centrally of said opening for spraying liquid therethrough in the form of a hollow cone and against the inner side of the cone of solid material, a liquid control valve for controlling the supply of liquid to said nozzle, and means interconnecting said annular valve and liquid control valve for synchronous adjustment of said valves to thereby correlate the rates of flow of solid material and liquid.

5. Apparatus as defined in claim 4, wherein said interconnecting means between said valves is adjustable to vary the proportionate rates of flow of the solid material and liquid.

6. Apparatus for uniting finely divided solid material and liquid, comprising means for spraying a flowing body of the solid material with a liquid, a chamber positioned to receive the sprayed solid material and having a sinuous channel therein for the flow of a mass of sprayed solid material, a series of rubbing elements mounted rotatably in said channel in adjacent tiers with their axes in relatively staggered relation and having blades thereon operative frictionally on the mass of material, and means connecting the rubbing elements for rotating them alternately in opposite directions in order from the upper to the lower end of the series with their blades interacting in synchronism.

7. A unit for combining finely divided sugar with shortening and blending the same with dry materials to form a mix for bakery products, comprising in combination, a batch blender having mixing means operative therein, means for supplying to the blender dry ingredients for a batch of such a mix, a hopper for supplying finely divided sugar having a conical lower section provided with an outlet opening and a cooperative valve for discharge of the sugar in the form of a hollow inverted cone, a spray nozzle positioned centrally in said opening, a storage tank to receive shortening having means for heating the latter to liquefy it, a supply tank connected to receive the liquefied shortening from the supply tank and connected to said nozzle, means for applying pressure to the supply tank to supply the liquefied shortening to the nozzle for spraying against the inner side of the hollow cone of sugar as the latter discharges from the conical section of the hopper, a rubbing chamber having a sinuous channel therein to receive the sprayed sugar and to discharge the same into the blender to blend with the dry ingredients for the mix, rubbing elements in said channel operative to produce a frictional rubbing action on the liquid-sprayed sugar during its passage through said channel, and means for discharging from the blender a batch of a mix blended therein.

8. A unit for blending dry ingredients and discharging a mixed batch thereof on the same level on which loading operation is performed, comprising a blender having a trough to receive the ingredients and blades operative therein to blend the ingredients and advance the blended ingredients toward one end of the trough, and discharging means for the blended ingredients having a casing connected at its lower end to the end of the trough of the blender toward which the ingredients are advanced and having a discharge at its upper end, and a screw conveyor mounted to rotate in said casing to receive the batch of blended ingredients from the blender and to discharge the same from its upper end.

9. Rubbing apparatus for uniting finely divided solid material and liquid, comprising a chamber having an inlet and an outlet for the flow of a mass of material through the chamber, a plurality of tiers of rubbing elements mounted rotatably in said chamber on axes in relatively staggered relation and having blades thereon elongated in the direction of their axes and operative frictionally on a mass of material in said chamber, the blades of the elements in adjacent tiers intermeshing and being operative to produce a rubbing action on the material in the chamber, and means for rotating the elements in directions to move the intermeshing portions of the blades of said elements in adjacent tiers downwardly and in synchronism.

10. Rubbing apparatus for uniting finely divided solid material and liquid, comprising a chamber having an upright passage therein for the flow of a mass of material therethrough, series of rubbing elements mounted rotatably in said passage in adjacent tiers on axes substantially parallel to the walls of said passage and having intermeshing blades operative frictionally on the material in said passage, said rubbing elements being closely confined between the walls of the passage to restrict the flow of material through said passage to the zones of operation of the bladed rubbing elements, and means for rotating the rubbing elements in adjacent tiers in relatively opposite directions and with their blades intermeshing in synchronism.

ARTHUR T. COAKLEY.

REFERENCES CITED

The following references are of record in the file of this patent:

UNITED STATES PATENTS

| Number | Name | Date |
|---|---|---|
| 323,681 | Holmes | Aug. 4, 1885 |
| 384,568 | Evans | June 12, 1888 |
| 912,628 | Sherman | Feb. 16, 1909 |
| 1,279,791 | Uiting | Sept. 24, 1918 |
| 1,558,069 | Williams | Oct. 20, 1925 |
| 1,700,510 | Oches | Jan. 29, 1929 |
| 1,788,345 | Skirvin | Jan. 6, 1931 |
| 1,790,347 | Hawkins | Jan. 27, 1931 |
| 1,855,548 | Forester | Apr. 26, 1932 |

OTHER REFERENCES

McCarthy, Food Industries, Modern Mixing, Nov. 1949, pages 79–88.